April 1, 1958 A. A. OBERMAIER ET AL 2,829,363
AUTOMATIC DEW-POINT APPARATUS
Filed May 31, 1955 5 Sheets-Sheet 1
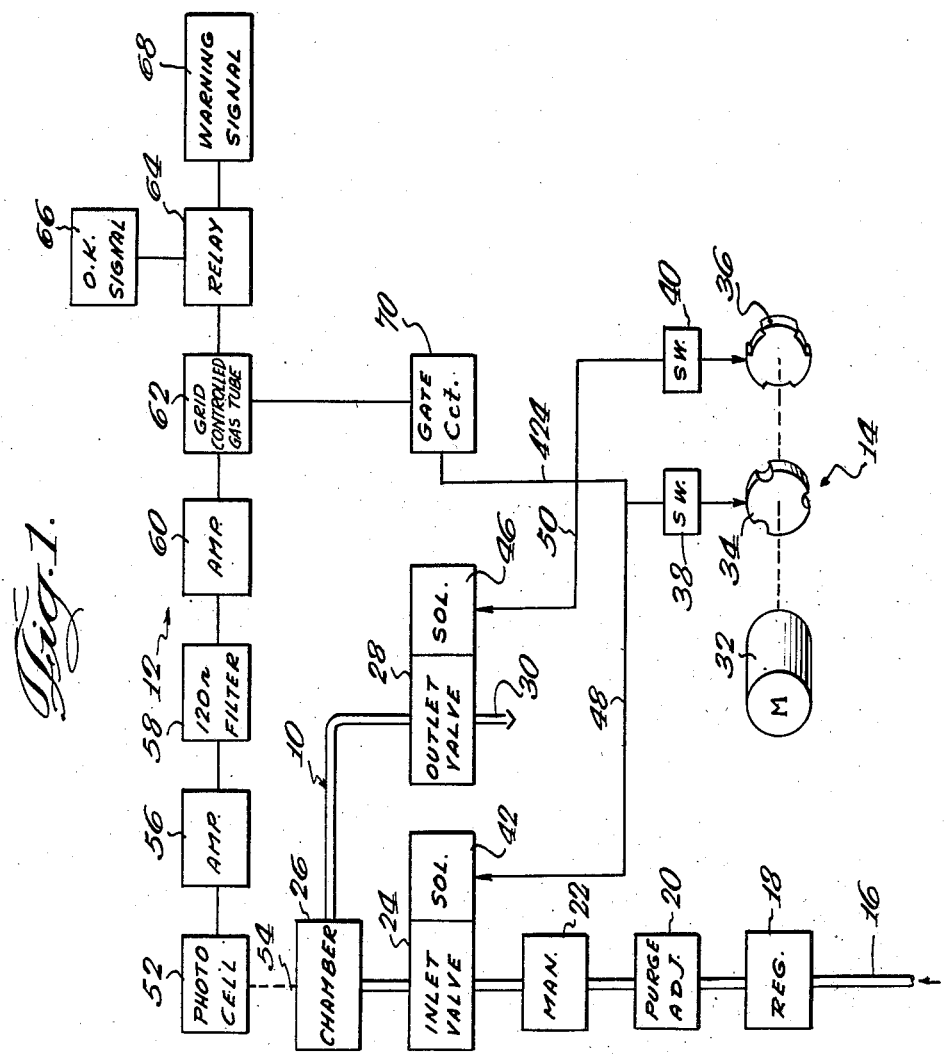

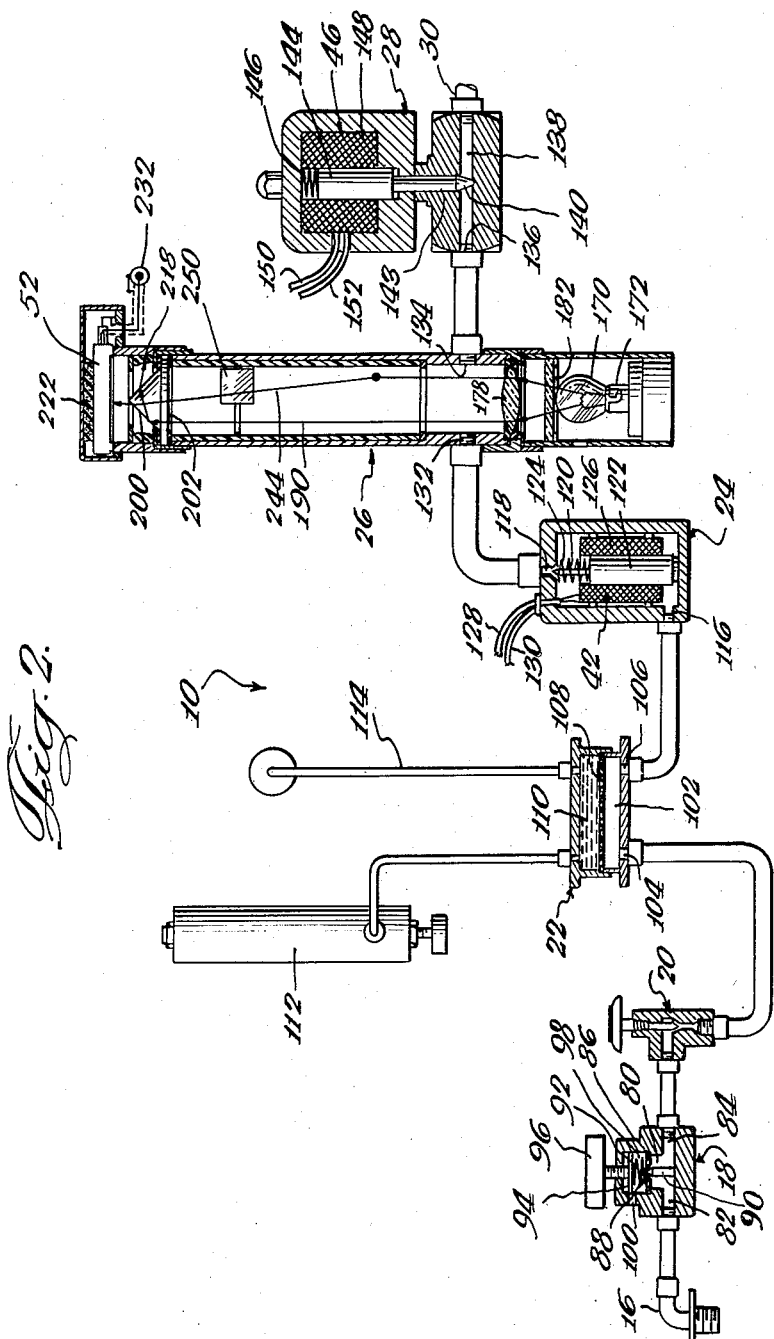

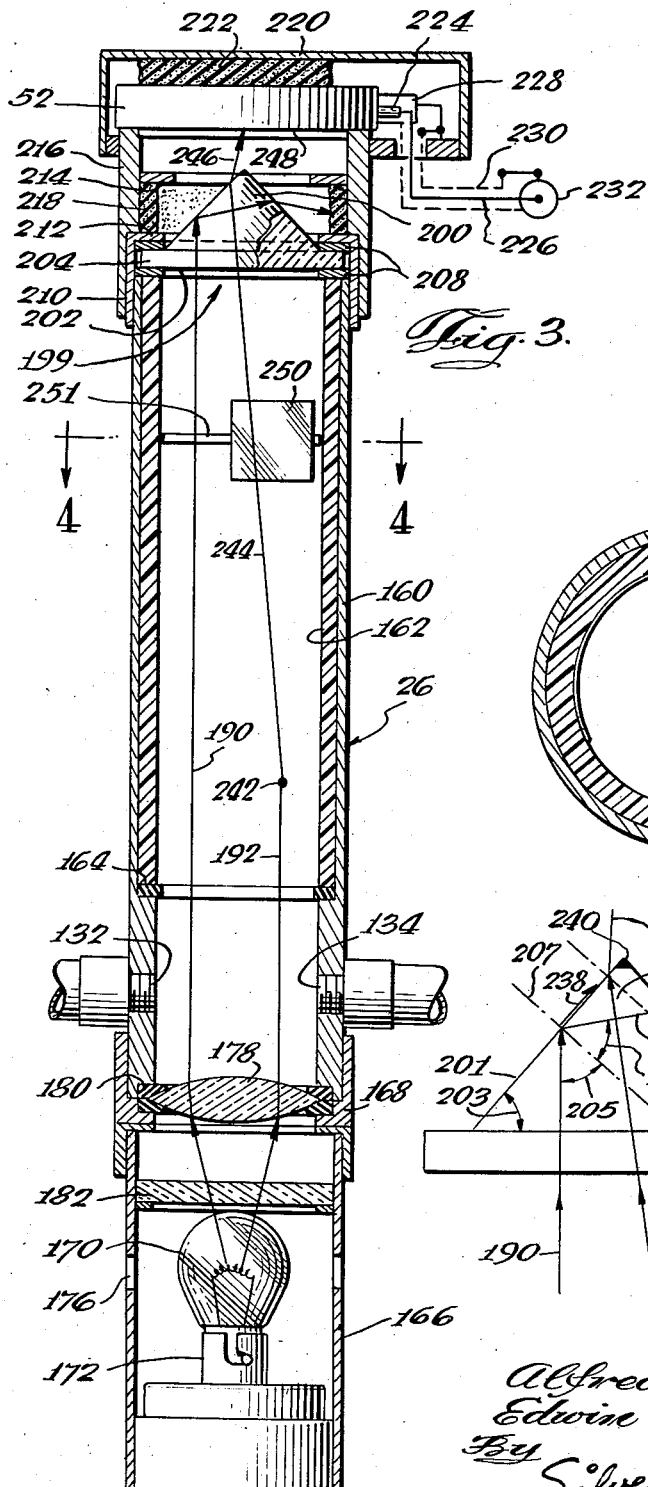
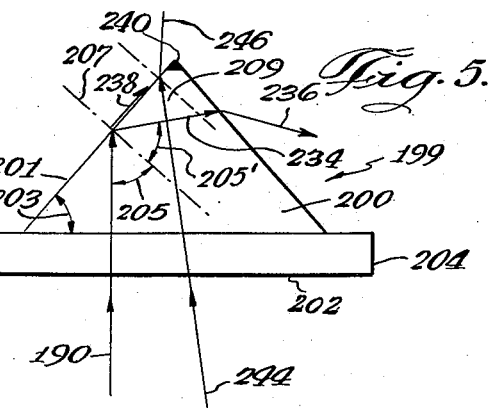

April 1, 1958   A. A. OBERMAIER ET AL   2,829,363
AUTOMATIC DEW-POINT APPARATUS
Filed May 31, 1955   5 Sheets-Sheet 4
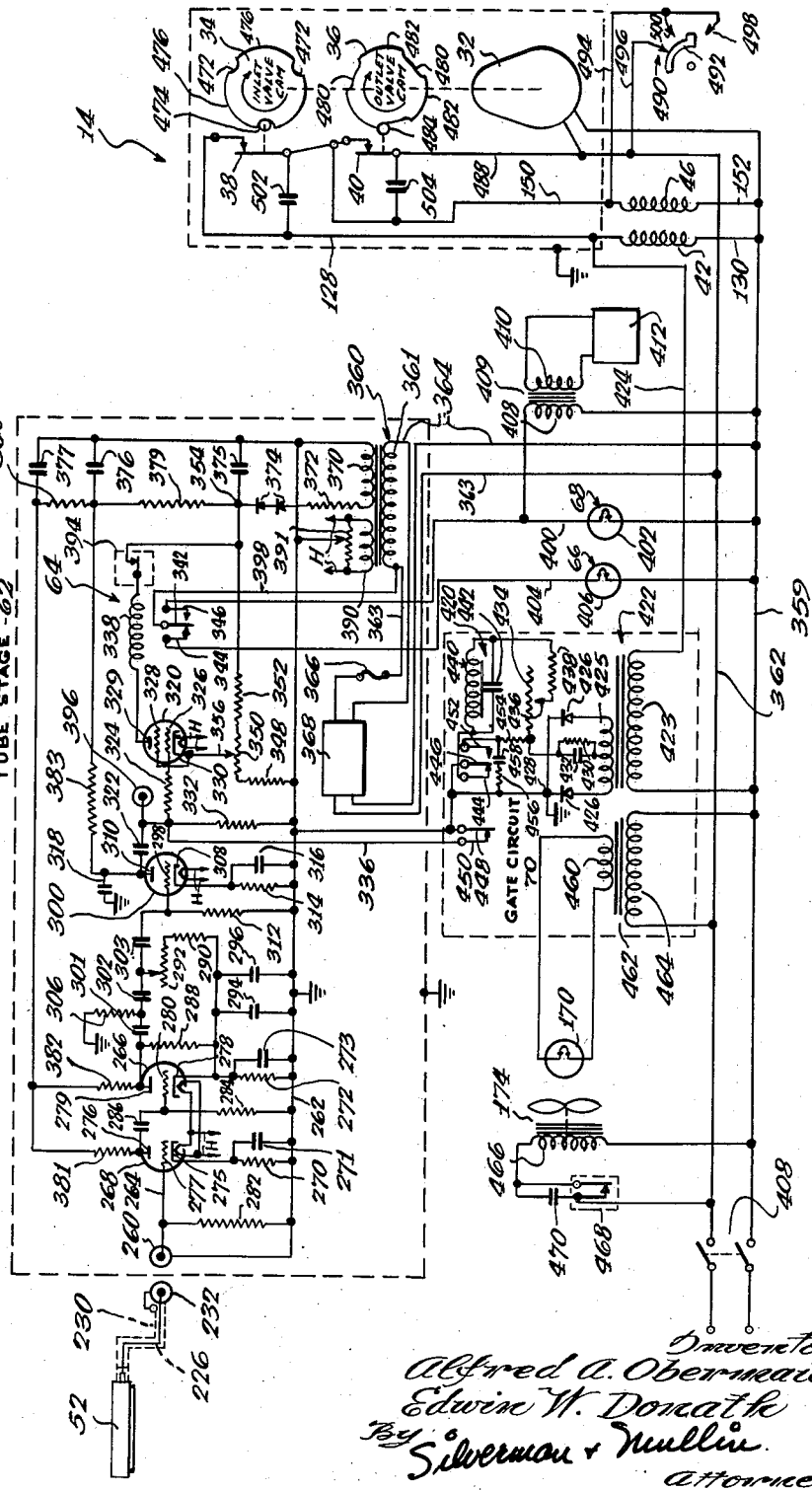

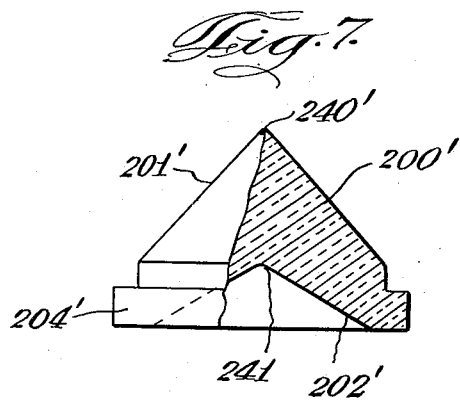
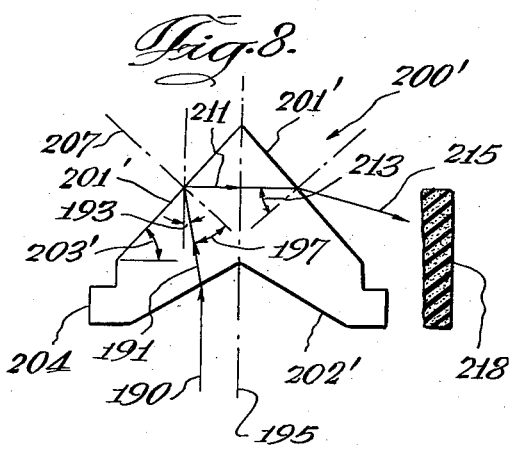
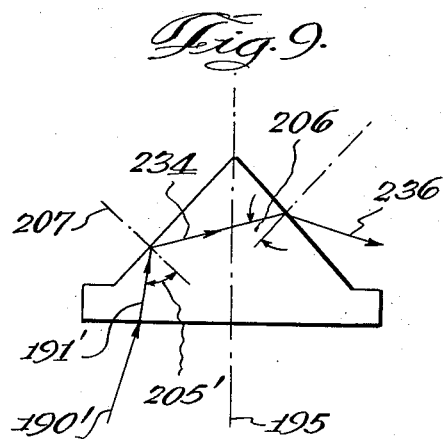
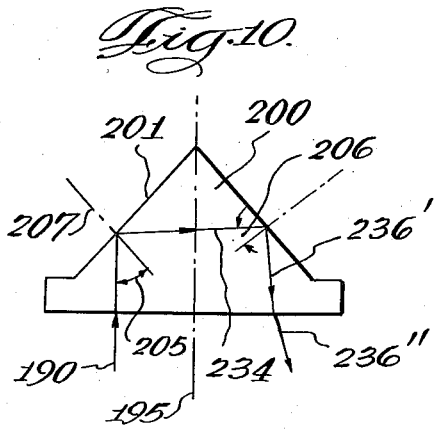

United States Patent Office 2,829,363
Patented Apr. 1, 1958

2,829,363

AUTOMATIC DEW-POINT APPARATUS

Alfred A. Obermaier, Park Ridge, and Edwin W. Donath, Arlington Heights, Ill., assignors to Illinois Testing Laboratories, Inc., Chicago, Ill., a corporation of Illinois Application May 31, 1955, Serial No. 511,894

22 Claims. (Cl. 340—228)

This invention relates generally to dew-point meters and more particularly is concerned with a dew-point apparatus which is operated automatically, ascertaining the dew-point of the atmosphere or some gas repeatedly, and causing an indicator, such as an alarm to operate when the dew-point as determined by the apparatus exceeds a pre-set value.

The basic manner of ascertaining the dew-point in the apparatus is described in U. S. Letters Patent No. 1,945,660, issued February 6, 1934, to M. Scott and U. S. Letters Patent No. 2,566,307, issued September 4, 1951, to J. R. Boyle. The method used is known as the so-called "fog chamber" method. Gas is admitted into a carefully insulated test chamber under a particular pressure. The pressure in the chamber is suddenly relieved, such as by opening the same to the atmosphere in case the gas is air, and the gas is thereby adiabatically expanded. Under such conditions the gas is cooled. If the cooling is sufficient to carry the temperature of the gas below the dew-point, the water vapor in the gas will condense as a fine mist or fog suspended in the chamber. The physical law which governs adiabatic expansion is expressed as follows:

$$T_2 = T_1 \left(\frac{P_2}{P_1}\right)^{\frac{K-1}{K}}$$

where:

$T_1$ is the initial temperature
$T_2$ is the final temperature
$P_1$ is the initial pressure
$P_2$ is the final pressure
$K$ is a constant (the ratio of the specific heat of the gas at constant pressure to that at constant volume).

The variables are expressed in absolute units. In the case of the fog chamber method, as for example where the gas is air, the expansion takes place from some pressure $P_1$, which is pumped into the chamber manually, to the barometric pressure $P_2$. The temperature $T_1$ is the temperature of the gas prior to expansion, and the temperature $T_2$ is the final temperature upon expansion. This latter is an elusive quantity for measurement in any gas expansion process, but is easily computed from the formula for any set of known conditions. $K$ for air is 1.40 and the power $$\frac{K-1}{K}$$

equals .280. The equation is easily solved by logarithms, by slide rule, or by pre-computed tables.

Now, in the manually operated apparatus, the operator makes repeated trials at different pressures $P_1$, until he obtains a value at which fog just becomes visible when the gas in the chamber is expanded to atmospheric pressure. The value of $T_2$ computed from the adiabatic expansion formula is then a very accurate and absolute measurement of the dew-point of the gas, made without reference to any standards and by virtue of a physical phenomenon characteristic of the information sought.

With the apparatus of the two patents above described, several trials are required for each determination of the dew-point. Once the fog has been achieved, a computation must be made. Thus, skilled personnel are engaged in using the instrument, and in cases where continuous dew-point information is needed, as in wind tunnel research, one or more operators may be continuously employed in making dew-point determinations.

This invention contemplates achieving the objects of the fog chamber dew-point meter automatically and continuously under conditions where it is desired not to exceed a given dew-point.

The invention is applied to a device which is adjusted continuously to expand the test gas under controlled conditions keeping the parameters of initial pressure $P_1$, final pressure $P_2$ and initial temperature $T_1$ substantially constant at some chosen values. The apparatus has programming means opening and closing the inlet and outlet valves in such a manner that the apparatus goes through a cycle comprising purge, stabilization and expansion several times a minute.

The objects of the invention are concerned with the provision of a system capable of accomplishing the above described programming and obtaining continuous expansions of gas.

A most important feature of the invention comprises the means for detecting the presence or absence of fog and this comprises a chamber having a novel optical system by means of which the amount of light impinging upon a photosensitive device is substantially increased with the presence of fog. The provision of such detecting means and the novel structure of the chamber comprise additional objects of the invention.

The apparatus is especially useful for giving an indication or sounding an alarm when fog appears, signifying that the dew-point of the gas being tested has increased above the value for which the apparatus has been pre-adjusted. The operator then knows that the moisture of the gas is above a pre-determined value and may take such measures as he desires to alter this situation. The operation of the indicating means in this apparatus is accomplished by feeding the output of the photosensitive device to an amplifier which closes or opens suitable switching means. The achievement of the novel results of operating the indicating devices when the dew-point has been reached or exceeded is another object of the invention.

In connection with the amplifier, additional objects of the invention comprise: the provision of novel gating circuitry for rendering the amplifier operative only at a small fraction of the respective cycles to prevent energization of the indicating means by spurious signals and surges in the circuit; the provision of novel filter means for eliminating line and lamp flicker interference.

While the description of the apparatus which follows will be directed to a dew-point alarm, such as will operate unattended once a predetermined pressure has been set into the device, it is not limited to such apparatus. In the previously referred to patents, the presence or absence of fog in the chamber required optical vertification by the observer. The observer therefore made continuous expansions and guessed as best he could when fog first appeared. The instant apparatus includes an adjustable pressure regulator which controls the initial pressure $P_1$ of the gas. Since the apparatus continuously recycles itself, all that the operator need do is slowly increase the initial pressure in successive steps until the indicator operates. The pressure measured on the manometer of inlet gas at this point is $P_1$ and the dew-point computation is easily made. The fog conditions under which the photosensitive cell will first produce a signal are practically uniform, hence no guessing or visual observation is required. As a matter of fact, the expansion chamber of this apparatus is fully enclosed. The speed and ease of using this apparatus for making dew-point measurements as described is appreciated by realizing that several expansions are accomplished each minute compared to the slower manual process of the prior apparatus in which even operating rapidly each expansion and purge required several minutes.

It is therefore another object of the invention to provide a novel dew-point meter which can be used and operated as generally described above.

The invention is not limited to any particular feature or phase of the apparatus which is described hereinafter, only to the extent that the claims set the same forth. Because of the nature of the invention, it would increase the length of this description to attempt to enumerate the specific objects of the invention, and hence the artisan skilled in the art will be left to recognize additional objects and advantages of the invention as a detailed description thereof is set forth hereinafter. This description is a specification of a preferred embodiment which is illustrated in the accompanying drawings, the preferred embodiment being shown in more or less diagrammatic form as to those parts of the apparatus which are conventional or well-known, such as valves, solenoids, and the like. The electronic circuit of the amplifier used in connection with the detecting means is also shown diagrammatically as is customary with structure of this kind.

In the drawings:

Fig. 1 is a block diagram of the entire apparatus of the invention, showing generally the gas path, gas flow or programming controls, and the detecting circuit.

Fig. 2 is a diagrammatic view showing the gas path, the various components thereof being illustrated in section, but also being in simple diagrammatic form, merely to show the basic construction and function of the components. The fog chamber is shown in relatively greater detail.

Fig. 3 is an enlarged sectional view of the fog chamber.

Fig. 4 is a sectional view through the fog chamber generally along the line 4—4 of Fig. 3 and in the indicated direction.

Fig. 5 is a diagrammatic view of the conical lens on an enlarged scale, showing the theoretical operation thereof.

Fig. 6 is a diagram of the electrical circuit of the invention, including the programming means and the gas path controls.

Fig. 7 is a side elevational view partly in section of a practical example of a conical lens for use with the invention.

Figs. 8, 9 and 10 are diagrammatic views for explaining the valve action of the conical lens system.

*Introductory description of functions performed*

Generally speaking, the invention is not limited to a combination or to any component of the apparatus to be described hereinafter. It is believed that a dew-point detecting device which gives repetitive and continuous determination and actuates some manner of indicating device when a pre-set dew-point has been achieved or exceeded is new. It is also believed that of the parts of the combined apparatus, the detecting means is new, both as to the fog chamber and its optical system, as well as the amplifier which is driven by the signal thereof. Mere amplification is not out of the ordinary, but the scheme for gating the amplifier so as to reject spurious signals, is ingenious.

Considering now the dew-point apparatus, the gas which is to be used and whose moisture content is to be ascertained is passed through a pressure regulator of some precision which serves as a pressure ratio adjuster and thence through various components of apparatus to a fog chamber. When expanded in the fog chamber, the gas will not produce a fog unless the adiabatic expansion results in the temperature thereof being lowered below the dew-point. There are inlet and outlet valves connected with the chamber for automatic introduction, expansion and purging of gas.

The chamber has a collimated light source originating at the bottom thereof which passes to a novel optical light valve at the opposite end, the light valve being interposed between the source of light and a photosensitive cell. The light valve operates to prevent collimated light from reaching the cell while scattered light caused by the occurrence of a fog will pass through the valve and reach the photosensitive cell to activate the same. The valving function is achieved by including at least one conical surface on the lens forming the light valve which points away from the source of light toward the photosensitive cell and causing the collimated light to strike the conical surface from the interior of the lens at the critical angle which theoretically causes all of the light to be first reflected within the lens and then refracted through another surface into a light trap. The presence of fog causes the otherwise collimated light to be scattered and deflected before entering the lens, and hence the scattered light will not engage the conical surface at the critical angle and hence will pass through.

The cell generates a small current which is passed through a resistor to provide a signal on the grid of the first stage of an electronic amplifier. This stage is subsequently coupled through differentiating means to cause the amplifier to pass only signals caused by sudden changes in intensity of the light impinging upon the photosensitive cell. This is to make the signal output of the amplifier independent of D. C. level of the signal from the photosensitive cell. The output of the amplifier is taken from a grid controlled gas tube which is normally non-conducting, but which energizes a relay when it does conduct. The relay, when operated, de-energizes one signal which indicates that the dew-point has not been reached or exceeded, and energizes another signal (or plurality of signals) which warns that the dew-point has been reached or exceeded.

The warning signal can be extinguished manually and the apparatus will commence operating again.

Through the use of a novel gating circuit, the gas tube of the amplifier is rendered inoperative except at a small fraction of a given cycle at which gas would produce a fog, if it could. Thus, the possibility of spurious signals operating the warning signal is minimized. Various filters are used to purify the signal passing through the amplifier.

The apparatus passes through a complete cycle which consists of purge, stabilization, and expansion three times a minute, the programming of valves being controlled by a switch system operated by motor driven cams.

With the above description generally in mind, the specific apparatus and components thereof will be explained in connection with the figures. Reference will be conveniently made by the reader to the overall block diagram of Fig. 1 as the explanation of the various parts proceeds.

*General structure*

The apparatus will generally be referred to as made up of the gas path designated 10, the detecting means designated generally 12, and the programming means designated generally 14. Of course these are inter-connected and inter-related as will be seen, and hence the designatory characters should be considered neither limiting nor expansive, but just a means for reference. For example, the inlet and outlet valves are solenoid operated, the solenoids being controlled by the programming means 14. The valves, however, are a part of the gas path 10, and hence there is relationship and physical connection between these parts.

Looking at Fig. 1, gas, such as for example air, enters the gas path 10 as shown in the lower left hand corner at inlet 16 and passes into the regulator 18 which controls the pressure of the gas prior to expansion into the fog chamber. Thence the gas passes to the purge adjuster 20 which regulates the rate at which the gas flows through the apparatus during purge; thence the gas passes through a manometer 22 and through the inlet valve 24 to the chamber 26. Note the gas path is identified by providing the interconnecting conduit as double lines in the drawing. From the chamber 26 the gas passes through the outlet valve 28 to the outlet 30.

The cycle of operation of the valves 24 and 28 is controlled by the programming means 14. A motor 32 is shown which drives a pair of cams 34 and 36 which operate respective switching means 38 and 40 connected respectively with the solenoids 42 and 46 operating the inlet and outlet valves. The electrical connections are diagrammed at 48 and 50 respectively as single lines.

Considering now the detecting means 12, note that the chamber 26 is actually a part of the detecting means. The optical connection between the chamber 26 and the photoelectric cell 52 is indicated as a broken line 54. The photoelectric cell drives the first two amplifier stages 56 producing a signal which passes through a filter 58, through a third amplifier stage 60 and operates the gas tube stage 62. The gas tube stage 62 drives the relay 64, but when the stage 62 is inoperative, the relay contacts are so arranged that an "O. K." signal 66, such as a green light, is energized. As soon as the gas tube stage 62 is energized, the relay 64 switches from the O. K. signal 66 to the warning signal 68. The gas tube stage 62 includes a grid controlled gas tube which is rendered inoperative through the major portion of the cycle by a gate provided by a gate circuit 70.

The above description should give a fairly good picture of the apparatus. Specific details of the various components will hereinafter be set forth.

*The gas path 10*

Gas enters the apparatus at the inlet 16, and as stated, it may consist of air under pressure, so that the desired initial pressure $P_1$ may be achieved in the chamber 26. The inlet leads to a gas regulator 18 whose function is of course to give the proper pressure $P_1$ in the chamber 26.

The simplified diagram of the regulator 18 in Fig. 2 discloses a lower chamber 80 having an inlet part 82 and outlet part 84, a diaphragm 86 having a center valve opening 88, a valve stem 90 with its end in the opening 88, a spring 92 pressing the diaphragm 86 down to close the valve opening 88, and a manually adjustable spring seat 94 which is movable vertically by rotating the hand wheel 96. The upper chamber 98 is relieved at 100.

When the pressure in the lower chamber 80 exceeds the desired value, the diaphragm 86 is lifted against the pressure of the spring 92. In this way the pressure entering the chamber 26 is kept at any desired value.

The purge adjuster 20 is a simple throttle valve to control and adjust the rate of sample gas flowing through the instrument during the purge cycle.

The manometer 22 is a simple device which comprises a gas chamber 102 through which the gas sample flows—from inlet 104 to outlet 106—having a slack diaphragm 108 which compresses an oil sump 110. The oil rises in a tube which has a transparent portion disposed adjacent a scale 112 calibrated to read pressure; 114 is a filler means.

The gas flows from the manometer 22 to the inlet valve 24 which is operated by the solenoid 42. The simplified diagram of the valve 24 illustrates an inlet port 116 and an outlet port at 118 the entrance to which is provided with a valve seat adapted to be engaged by the conical end of the valve stem 120. The valve stem 120 is carried by the movable core 122 which is normally pressed downward by the spring 124 thereby keeping the outlet port normally open. The coil 126 of the solenoid 42 is spaced from the housing so that there is free passage of the gas from the inlet 116 through the housing to the outlet.

Obviously, the inlet valve 24 is normally open so that the normal condition of the chamber 26 is that the desired pressure of gas exists therein at all times (providing the outlet valve 28 is closed). The solenoid 42 when energized, serves to raise the core 122, closing the valve. Power for the coil is obtained through the wires 128 and 130, connected in a manner to be described, with the programming means 14.

The gas sample passes from the inlet valve 24 to the chamber 26 where it is admitted by way of the port 132 and exhausted after expansion or during purge through the outlet port 134. The details of the chamber are described separately hereinafter, since, as stated previously, the same can be considered either a part of the gas path 10 or a part of the detecting means 12.

The outlet port 134 of the chamber 26 leads to an outlet valve 46 which is also solenoid operated. There is an inlet 136 and the outlet 30 is the outlet of the entire gas path 10. The intervening passageway is blocked by the valve means 140 carried by the valve stem 143 which in turn is secured to the reciprocable core 144. Spring 146 normally pushes the core 144 downward to close off the passageway 138. The energizing of the coil 148 by means of the wires 150 and 152 raises the core 144 against the pressure of the spring 146 to open the passageway 138 and permit efflux of gas from chamber 26.

The description of the gas path 10 has included specific description of components which are more or less conventional and available through the usual commercial channels. Thus, the valves 24 and 28, the regulator 18, and the purge adjuster 20 are in and of themselves replaceable by any of a wide variety of devices providing somewhat the same structure but performing substantially the same function. The practical example of the invention included commercial versions of these components. The valves were obtained as stock items from the Skinner Electric Valve Division of the Skinner Chuck Company of New Britain, Connecticut. The regulator was a stock item of the Kendall Controls Corporation of Waltham, Massachusetts.

*Fog chamber 26*

For the description of the fog chamber 26, attention is invited to Figs. 3, 4 and 5. The chamber is arranged vertically and comprises a cylindrical outer housing 160, which may be of metal, having an inner lining 162 of some highly insulating material to cause the gas itself to retain its heat during expansion. The bottom end of the liner 162 is set into a gasket 164 to prevent escape of pressure between liner and housing 160.

The lower part of the chamber 26 consists of a lamp housing 166 which is secured to the cylindrical housing 160 by means of a suitable coupling assembly 168 which may be brazed or otherwise fastened in position.

Lamp 170 is mounted in a lamp base 172 which in turn is secured to the housing 166. A fan 174 (see Fig. 6) cools the lamp, ventilation being provided by openings 176. The filament of the lamp 170 forms a light source, the rays from which are rendered parallel by a collimating lens 178 secured between suitable gaskets 180 at the bottom of the cylindrical housing 160. Between the lamp 170 and the lens 178 there is a heat glass 182 of properties to prevent the transmission of infra-red from the lamp 170.

Rays passing upward in the chamber are designated 190 and 192, and it should be obvious that unless interrupted, said rays will be parallel throughout their entire paths. 190 is an undiverted ray, and 192 is one which has been intercepted and deflected and thereby caused to move on a path 244 not parallel to the walls of the liner 162.

The upper end of the chamber 26 is provided with an optical light valve, designated generally 199. In this embodiment the valve takes the form of a conical lens 200 capping the upper end of the chamber 26. A flat bottom surface 202 is shown arranged normal to the ray 190 and the ray 192 before diverted, and the lens has an annular flange 204 alongside the bottom by means of which the lens is mounted through the use of upper and lower clamping gaskets 208 cooperating with the upper ends of the housing 160 and liner 162 as well as a bushing forming a lens cap 210 having an annular flange 212 to retain the pressure within the chamber 26. Spaced above the flange 212 is an annular ring 214 forming an iris or lens stop to limit the aperture of the conical lens 200. The walls of the upper housing 216 which engage over the lens 200 and provide support for the photoelectric cell 52 are lined with black felt or other light absorbing material 218 between the ring 214 and the flange 212. This forms a light trap for a purpose presently to be described.

The cone of the lens 200 protrudes through the light trap and has its axis aligned with the axis of the chamber 26 as well as the axis of the photoelectric cell 52 which is mounted on top of the housing 216 and enclosed by a suitable enclosure structure 220 and insulated therein by any suitable material such as foam rubber 222. One terminal 224 of the cell 52 is connected with the conductor 226 of a connecting cable of conventional design, and the other terminal 228 which may be the casing of the cell 52, is grounded and connected to the shield 230 of the connecting cable. The separable connector of the cable 226, 230 is designated 232 and is engaged with a cooperating portion comprising the input of the detecting means 12.

Before proceeding further with the description of the detecting means 12, it would be well to describe the operation of the fog chamber optical system. The passage of light between media of differing indices of refraction results in both reflection and refraction at the line of separation of the media. Refraction of light signifies the bending of that portion of the incident light which passes into the second medium from the first and which because of the difference in indices of refraction produces such bending. The angle of incidence, that is the angle between the direction of impinging light and a normal to the surface between media, varies the angle of refraction and the quantity of light refracted and reflected. Where the angle of incidence is zero, that is the impinging light is normal to the plane between media, the greatest amount of light is transmitted, that is, passes through the boundary between media, and the bending is a minimum. This occurs when a ray such as 190 enters the lens 200 from the bottom face 202.

Increasing the angle of incidence in the case of the light passing from the conical lens into air increases the bending away from the normal until, at some critical angle of incidence, the angle of refraction is substantially 90° and the refracted light is practically extinguished, being substantially totally reflected from the barrier, i. e., the conical surface on the interior of the lens. Small amounts of light may pass through the barrier, because of imperfections in the lens, but this is of little consequence.

The conical lens 200 of the light valve 199 is so constructed that the angle of the upper conical surface, forms a critical angle with light rays striking the surface from the inside of the lens. Obviously the angle of incidence must be controlled in some manner as will be hereinafter explained. Examining Fig. 5, a diagrammatic representation of a generalization of the light valve 199, the surface of the conical lens 200 is designated 201 and is defined by a base angle 203. From geometrical considerations, angle 205 is the angle of incidence and is equal to angle 203. Presuming that the angle 205 is the critical angle, considering the index of refraction of the material from which the lens 200 is formed, a ray 190 parallel to the axis of the lens 200 will strike surface 201 at the critical angle of incidence 205 relative to the normal 207 and be totally reflected on the interior of the lens along the path 234 at an equal angle of reflection 205', impinge against the interior of the opposite side of the conical surface 201 at an angle of incidence less than the angle 205 and hence pass through along path 236 into the light trap 218, being downwardly refracted in so doing.

Such light as may pass through the lens 201 from the ray 190 because of imperfections in the lens will be practically negligible. The tip is rendered opaque as shown at 240, by means of black paint or the like to block light which may get through the lens at that point due to tip imperfections.

From the above consideration, it is theoretically explained that all light rays originating in lamp 170 and collimated by lens 178 will be parallel with the axis of the lens 200 and will follow generally the course of the ray 190 and thereby be prevented from passing through the light valve 199 to the photoelectric cell. Thus, the cell cannot be activated by such collimated light.

Light rays which engage the interior of the conical surface at angles other than critical angle 205 will result in light passing through the valve 199 to the photoelectric cell. If at angles greater than critical, although totally reflected on the interior of the lens at one side, the angle of striking the other side is such as to most likely refract them upward and out of the light trap, and if at angles less than critical (which is more likely to be collected by the cell) the rays will pass through the lens 200. Considering a fog particle 242 encountered by a parallel ray 192, the light resulting will be deflected or scattered within the chamber 26, and result in a light path 244 not at all parallel to the axis of the lens 200. It strikes the surface 201 (neglecting for the moment change in direction upon entering the medium of the lens 200 at the surface 202), at an angle of incidence 209 which is less than the critical angle 205, and hence a substantial amount of the light of the ray passes through into the space above the lens along the line 246 and impinges upon the sensitive under surface 248 of the photoelectric cell 52 causing same to generate an electric current.

From the above it can be seen that, whenever, as a result of adiabatic expansion of the gas in the chamber 26, a fog is formed, the photoelectric cell will produce a current. The optical light valve 199 is therefore normally closed, and is "opened" by scattered or deflected light caused by the presence of a fog. In order to eliminate the likelihood of supersaturation in the gas which might result in the dew-point being reached without the formation of vapor, a member 250 formed of radioactive metal foil is mounted on an expansion spring 251 which is resiliently mounted in the upper portion of the chamber 26 to ionize an infinitesimal fraction of the test gas and provide "seeds" of negative ions to promote the formation of the droplets of moisture from which the fog is formed at the earliest possible time.

As stated above, the description of the optical light valve 199 made with reference to Figs. 3, 4 and 5 has been theoretical in order that the general operation of the fog chamber optical system be understood. It is desired to point out that the results described are difficult to achieve where the light reaching the optical valve is collimated and the lens has a perfectly flat bottom. This will be explained shortly, but it is at this point desired to refer to Fig. 7 wherein there is shown a preferred and practical lens formed of some suitable material such as a synthetic resin or a good grade of glass having fairly low index of refraction for a solid, say of the order 1.5. The lens is designated 200' and same is provided with an upper conical surface 201' and a lower surface 202' which, as will be noted, is concavely conical. A flange 204' is the equivalent of the flange 204. Collimated light 190 first impinges against the surface 202′ and is refracted along a line 191 which is at an angle 193 with the axis 195 of the lens 200′. Through variation of the angle of the conical surface 202′ it is practical to cause the ray 191 to impinge against the inside of the surface 201′ at any desired angle of incidence 197 relative to the normal 207. The light is totally reflected on the interior of the lens 200′ along the line 211 which makes angle of incidence 213 with the other side of the lens surface 201′. The angle 213 is less than the angle 197 and hence the light will pass through the barrier and be refracted along the line 215 into the light trap 218.

In the above description of the preferred example of lens it will be noted that the angle 197 was stated as being greater than the angle 213. This condition can only exist in the conical lens 200 if the critical angle 205 is greater than 45°. Otherwise the light will follow the path shown in Fig. 10. Here the ray 190 enters the lens, is reflected along the line 234, and strikes the opposite surface 201 at an angle of incidence 206 which is either the same as or greater than angle 205. It is therefore again reflected along the line 236′ instead of passing through the barrier and being refracted along the line 236 as shown in Fig. 5. A second refraction which occurs when the ray passes into the gas along the line 236″ produces non-collimated light in the chamber 26 which again passes into the lens 200, and being scattered and deflected, goes on through to the photosensitive cell.

By computation it can be determined that in order for the critical angle 205 to be greater than 45° it is necessary that the index of refraction of the lens material must be less than 1.414 which is extremely low. Very few materials have this low index of refraction, and, at the present time, none practical for use with apparatus of this kind. Hence, one must resort to the structure of Figs. 7 and 8 or vary the direction of the entering light from parallel if one desires to use the flat bottom cone. In Fig. 9, for example, instead of providing perfectly collimated light, slightly converging rays 190′ are provided by simple adjustment of the distance of the lamp 170 from the lens 178. The angle 205′ is then rendered greater than the angle 206′ so that the light follows path 191′, 234, and 236 into the light trap. The resulting light valve is less efficient, however, and better results are obtained with the lens 200′ and perfectly collimated light.

In a practical example of lens 200′ the light emerges around the lens along the line 215 making an angle of about 110° with the lens axis 195 which made it quite practical to have a low height for the light trap 218. The base angle 203′ was about 51.5°, and the other dimensions of the conical portion conforming to the base angle. The index of refraction was 1.5, the material being a methyl methacrylate resin. The critical angle 197 was about 42° and hence it was necessary to form the conical surface 202′ in such a manner that the incoming light 190 would be refracted on the interior of the lens by about 9 or 10 degrees (angle 193). Note that without the conical surface 202′ the angle at which the collimated light would strike the surface 201′ would have been more than 50°. For this lens, the angle 213 turned out to be a little more than 35° and hence the light passed through along the line 215. The tip of the lens 200′ is rendered opaque as at 240′ as is the tipe of the conical surface 202′ at 241. Black paint may be used.

The light valve shuts out the collimated light and passes the scattered light, and hence if expansion occurs in the chamber 26 and the resulting temperature $T_2$ is above the dew-point there will be no fog, and hence the light will remain parallel within the chamber, no light reaches the cell 52 and there is no signal applied to the amplifier. In the case of a light valve where the light has been slightly converged as the ray 190′ the same condition will prevail. Some light may reach the cell from the source during conditions of no fog, but since the amplifier is insensitive to D. C. level, it is of no consequence. Only the presence of fog will give sufficient increase in light reaching the cell to cause a change in the output of the photosensitive cell, and only such change will be detected by the amplifier. Other methods of compensating for a level correspondng to some light getting through an inefficient light valve can be used.

*Detecting means 12*

As previously stated the detecting means 12 may be considered to include at least part of the fog chamber 26 since the optical system for detecting the fog is built into the chamber. For the purposes of this section, the discussion can begin with the separable connector 232 which is connected with the cable 226, 230 leading from the photoelectric cell 52.

In Fig. 6 the circuit diagram has a portion designated by the general reference character 12. This consists basically of an amplifier which strengthens the signal produced by the current flow of the photoelectric cell 52, filters it, and applies it to a gas tube the output of which drives a relay to energize the warning signal means. The gate circuit 70 is also shown, the purpose of which is to "unlock" the gas tube, as it were, to accept signals only at a small fraction of the cycle.

Considering first the left hand portion of the diagram, there is illustrated a three stage resistance coupled amplifier the first stage of which is driven directly from the signal obtained due to the current in the photoelectric cell 52. The separable connector 232 is connected with the separable connector 260 which has its low potential side grounded to the common ground 262 and its high potential side connected by lead 264 to the tube 268. Tube 268 is shown as the left half of a dual triode, the right half being designated 266. The first and second stages are collectively designated 56. The tubes 266 and 268 are each biased by means of the cathode biasing combination of resistor and parallel capacitor, designated by reference characters 270, 271, 272, and 273. Each of the tubes has a cathode, plate and grid designated respectively 275, 276 and 277 in tube 268 and 278, 279 and 280 in tube 266. Tube 268 has grid leak resistor 282 connected between its grid 280 and ground.

The signal applied to the first stage consists of the D. C. potential produced by flow of current through the resistor 282. The first and second stages are coupled together by the capacitor 286 and the output taken from the plate 279 appears at the upper end of the resistor 288. The combination of resistor 284 and capacitor 286 form differentiating means to limit the input to grid 280 to changes in signal only. Thus D. C. level of current output of the cell 52 will have no effect on the signal passed by the amplifier 12. The resistors 288, 290 and 292, the latter of which is variable, are portions of a filter network 58 between the second and third stages. The capacitors 294 and 296 connect from the bottom ends of the resistors 288 and 290 to ground 262. The series connection between plate 279 and the grid 298 of the triode 300 which comprises the third stage 60 has three capacitors 301, 302 and 303 interposed therein. The center between capacitors 301 and 302 is grounded through a resistor 306 and the capacitor 303 serves as means for coupling the filter to the third stage.

The third stage 60 is a conventional resistance coupled amplifier. The tube 300 has cathode 308 and plate 310. Resistor 312 is grid leak to ground and the biasing combination of resistor 314 and capacitor 316 is conventionally connected. The plate 310 is by-passed to ground through capacitor 318.

The output of the third stage passes to the next stage 62 which includes tube 320, a grid-controlled gas discharge tube, of the type manufactured and sold by the General Electric Company of Schenectady, New York, under the trade mark "Thyratron." The coupling is achieved through a series capacitor 322 and a series resistor 324 to the grid 326. The grid 328 and cathode 330 are connected together. The left hand end of the resistor 324 is grounded through resistor 332. This same point is connected to the gate circuit 70 by the lead 336 for a purpose to be described.

The plate 329 of the tube 320 is connected through the solenoid 338 of the relay 64 which may be termed the signal relay. Note that there is a movable contact arm 342 which engages the left contact 344 normally, but which moves to contact 346 when the solenoid 338 is energized. The cathode 330 of the tube 320 must be kept more positive than the grid for proper operation of the tube and hence a bleeder arrangement consisting of resistors 348, 350 and 352 in series is connected from point 354 to ground. The resistor 350 is variable and the cathode 330 connects with the wiper through lead 356.

The plate potentials for the tubes described are obtained from a rectifier power source comprising a transformer 360 the primary 361 of which is connected across the line 362, 359 by leads 363 and 364. Tracing the leads 363 and 364 in Fig. 5 it will be seen that there is a fuse 366 and a commercially available 60 cycle filter 368 therein. The filter 58 interposed between the second and third stages is for removing 120 cycle ripple likely to be caused by the lamp 170 so affecting the output of the photoelectric cell 52.

The secondary winding 370 has a series resistor 372 and two or more series rectifiers 374 so arranged to render the point 354 a positive high voltage potential above ground. Capacitors 375, 376 and 377 are filtering devices, and the resistors 379 and 380 both filter and drop the potential. Each of the amplifier tubes has a voltage dropping resistor to adjust its plate characteristics, as indicated at 381, 382 and 383 and each resistor is connected to an appropriate side of the resistor 380 to give sufficient potential for its tube.

All of the heaters for the filaments are designated by the character H and are connected across the heater winding 390 which is in parallel with a center tapped resistor 391 for additional filtering.

The switch 394 in series with the solenoid 338 is manually operable, and the connector 396 is a testing point.

It will be seen that the movable arm 342 of relay 64 connects with lead 398 to line lead 363. Contact 346 connects with the other side of the line 359 by a conductor 400 which is in series with a signal lamp 402. This lamp 402 corresponds to a warning signal means, designated 68 in Fig. 1.

The other contact 344 is connected to the line 359 through a conductor 404 through another lamp 406. This lamp 406 corresponds to the O. K. signal means 66 of Fig. 1. Obviously, when the entire circuit is energized, as by closing the switch 408 the lamp 406 will ignite and stay ignited so long as the solenoid 64 is not energized. Upon energization of the said solenoid, the arm will move to contact 346 and the lamp 406 will extinguish while the lamp 402 will ignite. This gives a visual signal, but an audible signal can also or alternatively be obtained by connecting the primary 408 of a buzzer or bell transformer 409 in parallel with the lamp 400. The secondary 410 provides the necessary energy for the audible signal device 412.

The grid-controlled gas discharge tube 320 of stage 62 is normally inoperative because of the grounding of the grid 326 by the conductor 336 by the relay 420. This relay is a part of the gate circuit 70 which "unlocks" the tube 320.

The gate circuit 70 provides a means enabling the positive signal from the tube 300 of the third stage 60 to ignite the tube 320 and cause the plate 329 to conduct. Once ignition of the tube 320 has resulted in flow of current through the tube, the grid 326 loses control and the tube 320 conducts continuously, thereby continuously energizing the signals 402 and/or 412. Removing the plate voltage as for example by opening the lead containing the switch 394 causes the tube to revert to nonconducting state if the grid bias is sufficiently negative. This is adjusted by the variable resistor 350.

With the grid 326 grounded, there will be no positive signal applied to the tube 320 which can affect its conduction. In connection with the programming means 14, the grid is disconnected from ground once for each cycle—for a matter of a fraction of a second during which, if at all, fog will form in the chamber 26. By this gating arrangement, spurious signals arising from abrupt line voltage changes and interference from motors, solenoid valves, and the like are less likely to give a warning signal indication.

The transformer 422 has its primary winding 423 connected from one side of the line 359 through the programming means by way of lead 424 (in a manner to be described) to the other side of the line 362. The secondary winding 425 is connected to a full-wave rectification circuit, using a rectifier 426 in the leads from each end of the secondary winding connected to a positive terminal 428 at ground potential so that the other side of the rectifier circuit is below ground. The center tap of the secondary winding 425 is connected through a filter comprising a parallel resistor and capacitor combination, 430, 432 to a variable resistor 434 having a slider 436 in series with another resistor 438 and the solenoid 440 of the relay 420. A capacitor 442 shunts the solenoid, and the solenoid terminates at the contact 444. This contact engages the movable arm 446 normally, the arm 446 being grounded as is the arm 448 which normally engages the contact 450 connected with lead 336. The contact 452 connects with the upper end of a resistor 454 which connects to ground through a series resistor 456 and capacitor 458.

The circuit above described provides a delay after the primary winding 423 is energized which may be adjusted by varying the value of resistor 434, such that the lead 336 is ungrounded for a fraction of a second, such as for example 1/10 of a second, at the time after the sample gas has been expanded in the chamber 26. When the solenoid 420 is energized, it moves the arm 448 off the contact 450 and disconnects the grid resistor 324 from ground. The left hand end of the solenoid which had been grounded through contact 444 is simultaneously ungrounded, and the circuit re-grounded by engagement of arm 446 against contact 452. The condenser charges are leaked to ground, and by this time the primary winding is no longer energized. The condenser 442 combined with the resistors 434 and 438 provide the RC delay circuit. The combination of elements 456 and 458 prevent sparking across relay contacts. Such safeguards are always advisable in apparatus of this character.

The lamp 170 is connected across the secondary winding 460 of a power transformer 462 the primary 464 of which is connected across the line 359, 362. The fan 174 has its motor 466 connected across the line also in series with an adjustable thermostat switch 468 which is designed to keep the temperature in the housing 166 constant. A condenser 470 prevents sparking of the thermostat switch.

Programming means 14

In order to render this apparatus automatic, it is necessary that some means be provided for the recycling of the same—in order to cause the apparatus to take a sample of gas, pass it into the chamber 26 at a predetermined pressure and temperature, expand the gas, detect the fog if present, purge the chamber and stabilize the apparatus for another cycle and so on.

For this purpose, the programming means 14 is provided, controlled by a constant speed electric motor diagrammatically represented at 32 in Figs. 1 and 6 energized directly from the line 359, 362. As indicated by the conventional symbols, the motor drives two cams, 34 and 36. The cam 34 has three circumferentially spaced recesses 472 into each of which the biased follower 474 is adapted momentarily to drop consecutively during rotation of the cam. The cam circumference has relatively long dwell portions 476 between recesses 472. Switch 38 is so arranged that the follower when moved to the right as viewed in Fig. 6, closes the switch as said follower momentarily drops into a recess 472. While the follower 474 rides on the dwell portions 476, the switch 38 is open. Note that the switch 38 has one terminal connected to inlet valve solenoid 42 by lead 128 which also connects to lead 424. When switch 38 is closed, it causes energization of the solenoid 42, operating the normally open inlet valve 24 to close same off while simultaneously energizing the gating circuit to "unlock" the grid controlled gas tube 320. This will actually occur providing the other side of the switch 38 is connected to the line lead 362 through the switch 40. The lower terminal of solenoid 42 (Fig. 6) is connected to the line lead 359 by lead 130.

Cam 34 may be termed the inlet valve cam.

Cam 36, the outlet valve cam, is constructed somewhat differently, in that the recesses 480 are much longer than the recesses 472 and the dwell portions 482 are much shorter than the dwell portions 476. There is a biased follower 484 which opens the switch 40 on the dwell portions 482 and closes the switch 40 on the recess portions. When closed, switch 40 causes energization of the outlet valve solenoid 46 through leads 150 and 488. This latter is connected to line lead 362, and the second side of the solenoid 46 is connected to line lead 359 by conductor 152. Since valve 28 is normally closed, energization of its solenoid opens the same.

The switch 490 is shown in operating condition. When the segment 492 is rotated slightly clockwise, or counter-clockwise, it closes a circuit between leads 494 and 496 which energizes the outlet valve solenoid 46 irrespective of the position of the cam 36. One position, say with contact 498 engaging segment 492 may be spring returned and the other position, say with the contact 500 engaging segment 492 may be without spring loading so that the contact keeps the outlet valve solenoid energized. Such a switch arrangement is needed for testing, manual purging, adjusting, etc.

Before proceeding with a detailed discussion of the operation of this device, the programming sequence might well be explained. Presuming that the motor 32 rotates at one R. P. M., obviously the cams 34 and 36 are intended to carry the apparatus through three cycles per minute. Other speeds are possible by obvious variation of structure.

Starting with the beginning of a typical cycle, during the first six seconds the inlet valve solenoid 42 is not energized, the follower 474 being on a dwell portion 476, and the inlet valve 24 is open. Sample gas can enter the chamber 26. During this six second period, however, the follower 484 is in a recess 480 and the switch 40 is closed energizing the solenoid 46 and keeping open the normally closed outlet valve 28.

Thus, during this initial portion of the cycle for a matter of six seconds the system is open to the gas inlet 16 and the chamber 26 is purged of all gas and moisture at a rate controlled by the purge adjusting valve 20.

The second period of the cycle requires an additional twelve seconds during which the follower 474 still rides a dwell portion 476 keeping the inlet valve 24 open. The follower 484, in the meantime has ridden out of its recess 480 and onto a dwell portion, thereby de-energizing the solenoid 46 and permitting the valve 28 to close. During this period, the sample gas is entrapped in the chamber 26 at a pressure measured by the manometer 22 and scale 112 regulated by the ratio adjuster 18. Temperature, as controlled by the thermostat 468, is permitted to stabilize during this period.

In the last two seconds of the twenty second cycle, the follower 474 drops into a recess 472 and closes the switch 38, but since the return of the circuit to the solenoid 42 and the gating transformer primary 423 is through the switch 40, nothing happens until the follower 484 drops into a recess 480. The solenoid operated valve 28 opens the chamber 26 to the atmosphere while the solenoid operated valve 24 closes and the gate delay circuit is energized. Shortly thereafter, the gas tube 320 is unlocked.

Condensers 502 and 504 across switches 38 and 40 eliminate transients.

Operation of the apparatus

From the above description which has been in some detail, the operation of the various components of the apparatus will be understood. In this portion of the specification, an attempt will be made to explain the manner in which the components cooperate to provide a highly useful and novel tool for use in continuously determining that the dew-point of a given gas is below a predetermined value. This tool with minor modification can serve other purposes which will occur to those skilled in the art. One useful purpose is for the determination of dew-point in quantitative terms, and this can be accomplished without modification of the apparatus.

The formula which was referred to hereinabove in the introduction to this description has four parameters: $T_1$, initial temperature; $T_2$, final temperature; $P_1$, initial pressure; and $P_2$, final pressure. The parameters $T_1$, $P_1$ and $P_2$ are all substantially constant in this apparatus, leaving only the temperature $T_2$ to be ascertained. The exponent $$\frac{K-1}{K}$$

will be known for any gas sampled.

The temperature $T_1$ in the chamber can be measured by any simple thermometer or thermocouple suitably located (not shown) and this temperature is kept constant by the simple fan 174 and thermostat 468 arrangement. The initial pressure $P_1$ is that at which the gas is introduced into the chamber 26 and this is adjusted at will by means of the regulator 18. One rotates the hand wheel 96 until the oil level read on the calibrated scale 112 is as desired. Final pressure $P_2$ is atmospheric, which remains substantially constant over long periods of time while the apparatus is in operation.

The adiabatic expansion of the gas in the chamber 26 can result only in a change in $T_2$ the final temperature of the gas. This temperature either will or will not result in a fog. If it does not, the dew-point has not been reached or exceeded, but if it does result in a fog, the dew-point has either been reached or exceeded.

Presuming that all of the necessary adjustments have been made the switch 408 turns the apparatus on and energizes the same. Adjustments include the following:

(a) Adjustment of the regulator 18 to give the desired initial pressure $P_1$.

(b) Adjustment of the purge control 20 to control the rate at which the apparatus is purged of gas when both inlet and outlet valves are open.

(c) Calibration of the manometer 22 and gauge 112.

(d) Adjustment of the optical system to cause proper focus, etc.

(e) Adjustment of the 120 cycle filter by varying the included resistance of resistor 292.

(f) Adjustment of the cathode bias of the gas tube 320 by movement of tap 356, termed "threshold."

(g) Adjustment of the time delay of the gate circuit by varying the included resistance of the resistor 434.

(h) Adjustment of the thermostat 468 to give desired temperature $T_1$ (adjustment means not shown, but conventional).

The energization of the apparatus causes the O. K.

signal 66 comprising, in this apparatus, lamp 406, to be energized, and this may be a green light. The apparatus commences to cycle and re-cycle. Each time the expansion occurs, at the third part of the cycle which consists of two seconds, the gas tube cathode 326 is ungrounded for a short length of time, say one-tenth second. This occurs immediately upon the completion of the expansion of the gas. It must be pointed out that during the expansion of a gas, irrespective of the presence of fog, there will be a gradient of different indices of refraction along the length of the chamber. While a fleeting phenomenon, the result may well cause disturbance of the collimated light passing through the chamber to give a measurable signal from light not impinging against the conical outer surface at the critical angle. The gating signal, therefore, must be delayed a sufficient amount to permit the expansion and the completion of change of state of the gas, and this of course is adjusted by the position of the slider 436.

When fog appears, a signal will come through the first three stages of the amplifier. There will be a coincident short period of ungrounding of the grid of the gas tube by the gating circuit 70 and this signal will render the gas tube 320 conducting, the tube continuing to conduct from then on. At all other times, the gas tube 320 is not conductive.

If no fog is produced in the chamber 26, there will be no change of signal produced across the resistor 282 because insufficient light will reach the photoelectric cell 52. The light passing through the chamber 26 which has been focussed by the lens 178, either collimated in the case of the light valve using the lens 200' or slightly converging in the case of the light valve 199 using the flat bottom conical lens 200, will be substantially reflected by the conical surface pointing away from the source of light within the lens and refracted into the light trap 218 below the ring 214. The opaque cone tips cut down on light which may pass through due to imperfections of the lenses. The absense of signal provides no positive signal on the grid of the gas tube stage 62.

If the dew-point of the gas is reached or exceeded during expansion, light will be deflected by the fog particles and hence will not enter the bottom surface 202' of the lens 200' parallel with the walls of the chamber or along the path 190' in the case of a flat bottom lens. A substantial portion of the light will therefore pass through the lens and strike the photoelectric cell 52 causing current to flow in the resistor 282. This results in a signal on the grid of the first tube 268 which through subsequent amplification becomes a positive pulse applied to the grid 326 of the gas tube 320.

When conduction occurs, solenoid 338 is energized, operating relay 64, extinguishing the green light 406 and energizing the warning light 402 which may be red. Simultaneously a buzzer or other audible signal may be energized, and both of the signal means will continue to operate until or unless the plate circuit of the gas tube 320 is interrupted as for example by opening switch 394.

The operator calculates the desired value of $T_2$ which it is desired not to exceed, and makes the necessary adjustments in the apparatus to cause the fog to be produced when $T_2$ is that maximum value, that is to say when the moisture content of the gas is such as to cause fog at a pre-computed temperature. The apparatus will then continue to make expansions until at some cycle fog is produced.

The second specific purpose for the apparatus which was mentioned is the use of the same quantitatively to determine dew-point of a gas. Under these circumstances, the operator slowly varies the pressure $P_1$ by changing the pressure of the pressure regulator until the signal is produced. At that instant he notes the pressure as determined from the manometer and can easily solve the dew-point equation. Since three determinations are made a minute this is a much faster method of determining dew-point than many used at this time. It is certainly simple and accurate without the need for careful observation or any skill whatsoever, except in reading thermometers and manometers.

In order to enable those skilled in this are to construct the apparatus hereof, a table of some of the important constants and the types of components used is set forth hereinafter:

| | |
|---|---|
| Tube of stages 56 | 12AY7 |
| Tube 300 | 6AB4 |
| Tube 320 | 5696 |

For a Bradley Luxtron photo-cell, type 1-1A, the resister 282 was 470,000 ohms. The grad leaks, bias components, etc. of the bare amplifier stages 56, 58 are well known, and can be ascertained from data published by manufacturers of the tubes. Voltage dropping resistors, rectifier components, etc. need not be set forth. As for others, these are typical resistor values:

| | Ohms |
|---|---|
| 288 | 43K |
| 290 | 22K |
| 292 | 50K |
| 306 | 22K |
| 324 | 100K |
| 332 | 220K |
| 348 | 680 |
| 350 | 3000 |
| 352 | 68K |
| 430 | 150K |
| 434 | 4K |
| 438 | 2K |
| 454 | 230 |
| 456 | 22 |

Of the above resistors those of the filter 58 are required to be accurate.

Typical capacitor values are as follows (in microfarads, with suitable voltage breakdown ratings):

| | |
|---|---|
| 294 | .03 |
| 296 | .03 |
| 301 | .03 |
| 302 | .03 |
| 303 | .25 |
| 318 | .001 |
| 375 | 40 |
| 376 | 40 |
| 377 | 40 |
| 442 | 20 |
| 432 | 100 |
| 458 | .005 |
| 502 | .01 |
| 504 | .01 |

Again, the capacitors of the filter 58 are required to be accurate.

The 60 cycle filter 368 can be a Mallory type Z-6 Interference Filter. All rectifiers are selenium oxide types, since power requirements of the apparatus are not great. The resistance of solenoid 64 is about 10,000 ohms, and that of solenoid 440 is about 2500 ohms. The lamp 170 is G. E. type No. 1489, and the thermostat 468 is Fenwall thermostat 17011. The motor 466 for the fan 174 is a fractional horsepower shaded pole motor of conventional construction. The motor 32 is a synchronous motor of conventional construction having one revolution per minute.

Conclusions

The invention has been set forth above with an example which comprises principally a dew-point alarm that is actuated when the gas which is introduced into the chamber 26 and expanded has such moisture content as to reach or exceed a pre-calculated dew-point. This apparatus will no longer be capable of accepting continued determinations of dew-point once the alarm has sounded until and unless the plate circuit of the gas tube stage 62 is opened which once more enables the gas tube 320 to respond to a positive signal on its grid. In other words, the grid is given control once more when the switch 394 is momentarily opened. Likewise, the use of the apparatus without variation for determining the dew-point of a given gas by manually adjusting the regulator 18 has been described.

It is also contemplated that the invention can be varied in a rather easy manner to serve other purposes. For example, instead of a signal device such as 68 (lamp 402 and/or buzzer 412) the operation of the relay 64 could easily energize a control device for removing moisture from the gas being introduced at 16. Thus. The dew-point device would be fully automatic to prevent the dew-point from exceeding or reaching a given value. Means such as a motor operated time delay could be used to automatically open and then close the circuit of the plate 329 to render the tube poised for the receipt of additional signals.

Likewise, the tube 320 may be replaced by a tube which conducts without taking control away from its grid. Such a tube would therefore open and close the relay 64 and the resulting signal would be intermittent. The relay could drive the moisture removing control device and the entire apparatus would be self-controlling.

Many variations and uses of the device are possible, and it is not deemed necessary to go into them any further. As for the specific example described, along with the variation in the optical system, an attempt has been made to set forth the same in considerable detail—perhaps in greater detail than required by statute. The result, however, is believed to render this specification lucid and complete and enable a better understanding of the construction, operation and manner of practice of the invention.

In summary, the invention comprises: an automatic dew-point apparatus which can be used as an alarm to signal that the sample gas introduced thereinto has reached or exceeded a pre-determined dew-point or as a device for measuring the dew-point of a gas through the use of the alarm, or can be used to control the dew-point of the sample gas; apparatus for continuously and automatically expanding sample gas in a test cycle to cause a fog to appear if the dew-point of the gas is reached or exceeded under the conditions of expansions; a novel fog chamber; novel fog detecting means; novel amplifying means operating in conjunction with the detecting means; novel optical valve means for use with the detecting means; novel gating means for controlling the amplifier; novel programming means for recycling; and other features as described.

The above specification has made reference to various theories in order to explain the operation of the invention and parts thereof. No limitation is intended by such theory, since the invention in its various phases is embodied in structure having certain characteristics and producing certain results irrespective of whether the theory elucidated is correct or not. Obviously great variations in details of the structure and characteristics may be made without departing from the spirit or scope of the invention as set forth in the appended claims.

What it is desired to claim by Letters Patent of the United States is:

1. Apparatus for producing an indication when the dew-point of a gas reaches or exceeds a given value, comprising a source of such gas, an expansion chamber, means for flowing a sample of gas from said source into said chamber at an initial pressure, means for maintaining the temperature of the gas within said chamber at a predetermined value, means for expanding said gas to a second volume of space of non-critical relation to the volume of said chamber and a second predetermined pressure less than said initial pressure, photo-sensitive means for detecting the presence of fog in said chamber, and electrically energized indicating means driven by said photosensitive means whereby to give an indication only when fog is formed in said chamber, a source of collimated light passing through said chamber and the light adapted to be deflected to non-collimated condition by fog, and the apparatus including optical light valve means between the source of light and the photo-sensitive device rendering the photo-sensitive device substantially inactive except when non-collimated light passes through said chamber, said photosensitive means adapted to produce an electrical signal only when fog is formed in the chamber, said indicating means comprising an electronic amplifier for magnifying the signal, a grid controlled gas tube connected to receive the signal so as to be rendered operative, electromagnetic switch means driven by the output of said gas tube, a warning signal device connected to be energized by operation of said electromagnetic switch means, and a gating circuit connected to limit operation of said tube in pre-determined timed sequence related to the fog formation in the chamber, if at all.

2. Apparatus for producing an indication when the dew-point of a gas reaches or exceeds a given value, comprising a source of such gas, an expansion chamber, means for flowing a sample of gas from said source into said chamber at an initial pressure, means for maintaining the temperature of the gas within said chamber at a predetermined value, means for expanding said gas to a second volume of space of non-critical relation to the volume of said chamber and a second predetermined pressure less than said initial pressure, photo-sensitive means for detecting the presence of fog in said chamber, and electrically energized indicating means driven by said photosensitive means whereby to give an indication only when fog is formed in said chamber, a source of collimated light passing through said chamber and the light adapted to be deflected to non-collimated condition by fog, and the apparatus including optical light valve means between the source of light and the photo-sensitive device rendering the photo-sensitive device substantially inactive except when non-collimated light passes through said chamber, said indicating means including an amplifier for increasing the strength of electrical signal obtained from the photo-sensitive device, a make-break device connected to receive said electrical signal and be rendered conducting, a warning signal device adapted to be energized only when said make-break device is rendered conducting, said indicating means including gating means operable simultaneously with the means for expanding the gas and connected to prevent said make-break device from conducting except at a short time at which fog will form in the chamber, if at all.

3. Apparatus as claimed in claim 1 in which the last mentioned means includes a ground-removing relay, and the gas expanding means is electrically operated, there being a common source of electrical energy for energizing the gas expanding means and the relay and common switching means for applying said electrical energy.

4. Apparatus as claimed in claim 1 in which the last mentioned means includes a ground-removing relay, and the gas expanding means is electrically operated, there being a common source of electrical energy for energizing the gas expanding means and the relay and common switching means for applying said electrical energy, and delay means between the switching means and said relay whereby the gas expanding means will have begun to operate prior to the relay.

5. Dew-point apparatus connected with an inlet source of sample gas at known pressure and discharging at an outlet to condition of said gas at a lower pressure and comprising, a gas path leading from said inlet to said outlet and having interposed therein, in the order named, an inlet valve, a gas expansion chamber, and an outlet valve, there being a light source in the gas chamber, a photo-sensitive device adapted to receive and be activated by light from said light source, and light-rejecting means between the light source and photosensitive device, means for operating the valve to lead gas into the chamber under said known pressure and thereafter adiabatically to expand the same in the chamber, and detecting means connected with and operated by said photo-sensitive device, but only upon the existence of a fog in said chamber rendering the light-rejecting means inoperative as to light passing through the fog, means for collimating the light from said source prior to passing same through said chamber, said light rejecting means comprising a lens having its optical axis aligned with said collimated light, a light trap adjacent the lens, said lens having surfaces directing substantially all of said collimated light into said light trap but permitting passage of uncollimated light, the existence of said fog rendering light passing through said fog uncollimated, the surface of the lens farthest from the light source being conical and the lens being constructed so that collimated light passing through the bottom and into the lens is automatically totally internally reflected from the conical source.

6. Apparatus as described in claim 5 in which the tip of the cone is opaque to prevent emergence of light therefrom.

7. In a dew-point detecting apparatus of the fog chamber type, a gas expansion chamber having means for introducing gas therein, a source of light adapted to pass through the gas in the chamber and means collimating the light prior to passage through the gas, optical means for receiving the collimated light after same has passed through the gas and transmitting only uncollimated light whereby presence of a fog in the chamber will cause passage of light through the optical means but substantially no light will pass if no fog is present, said optical means comprising a conical lens having its axis arranged parallel with said collimated light, and having a conical surface pointing away from the source.

8. In a dew-point detecting apparatus of the fog chamber type, a gas expansion chamber having means for introducing gas therein, a source of light adapted to pass through the gas in the chamber and means collimating the light prior to passage through the gas, optical means for receiving the collimated light after same has passed through the gas and transmitting only uncollimated light whereby presence of a fog in the chamber will cause passage of light through the optical means but substantially no light will pass if no fog is present, said optical means comprising a conical lens having its axis arranged parallel with said collimated light, and having a conical surface pointing away from the source, and having its conical angle critical to provide maximum internal reflection of collimated light passing into the lens, through the same, and impinging against the interior of the said conical surface.

9. In a dew-point detecting apparatus of the fog chamber type, a gas expansion chamber having means for introducing gas therein, a source of light adapted to pass through the gas in the chamber and means collimating the light prior to passage through the gas, optical means for receiving the collimated light after same has passed through the gas and transmitting only uncollimated light whereby presence of a fog in the chamber will cause passage of light through the optical means but substantially no light will pass if no fog is present, said optical means comprising a conical lens having its axis arranged parallel with said collimated light, and having a conical surface pointing away from the source, and an annular light trap coaxial with the lens arranged to receive light internally reflected and thereafter refracted by the lens.

10. Apparatus as described in claim 7 in which the chamber comprises an elongate tubular member having said source and collimating means at one end and optical means at the other end, the gas introducing means therebetween, and the tubular member, collimating means and optical means all being co-axial.

11. In a dew-point detecting device of the fog chamber type in which there are inlet valve means and outlet valve means, a fog chamber having an electrical signal producing device operative to produce such signal only when a fog is present, solenoids operating the valve means, re-cycling programming means energizing the solenoids in sequence to introduce, expand and expel gas from said chamber for each cycle; a detector connected to receive said electrical signal and indicate for presence, said detector comprising a multi-stage electronic amplifier a make-break device driven by the amplifier, a warning device adapted to be energized by the make-break device, and gating means connected to be energized by said programming means for unlocking said make-break device only after said gas has expanded.

12. A recycling dew-point detector comprising a gas chamber, a source of gas at an initial pressure connected to said chamber and having a normally open solenoid-operated inlet valve between source and chamber, a normally closed solenoid-operated outlet valve relieving said chamber and connected between said chamber and a lower pressure volume of said gas, means for maintaining constant temperature of the gas in the chamber, a collimated light source at one end of the chamber and a lens at the outer end, said lens being constructed to pass non-collimated light only, a photo-electric device disposed to receive said non-collimated light passing through the lens and produce an electrical signal, an electronic amplifier including a normally non-conducting grid-controlled gas tube connected to be driven by said electrical signal, a warning device driven by the output of the gas tube but only during conduction, electrically operated gating means connected with the gas tube for unlocking said tube to permit conduction only during a fraction of each cycle, and programming means causing recycling, said programming means including rotating cam means and switches operated thereby for connecting or disconnecting said inlet and outlet valves and gating means relative to a source of electrical energy in the following sequence for each cycle, continuously repeating said cycle: first energizing the outlet valve to open same, and purge the chamber, then de-energizing said outlet valve to permit flow of gas into said chamber at said initial pressure, then energizing said inlet and outlet valves to close the inlet valve and open the outlet valve and simultaneously energizing said gating means.

13. A device as described in claim 12 in which delay means is associated with the gating means to delay the unlocking until the time after opening said outlet valve that fog would form.

14. A device as claimed in claim 12 in which said amplifier has filter means for preventing flicker of said light source from passing through the amplifier.

15. In a dew-point apparatus of the fog chamber type, a gas expansion chamber having means for introducing gas therein and expanding same to cause fog, a source of light adapted to pass through the gas in the chamber, optical valve means for receiving light from the source after passing through the gas, and constructed to block rectilinearly directed rays of predetermined paths, means for focussing the light from the light source prior to passage through the gas to cause same to pass rectilinearly and directly to said optical valve means along said predetermined paths, said optical valve means serving to permit passage of all other light, whereby if fog forms in said chamber and deflects light from said predetermined paths, a substantial portion will pass through the said optical valve means, but if no fog is formed, substantially no light will pass through said optical valve means, said optical valve means comprising at least one lens having its optical axis substantially coincident with the chamber axis and provided with a conical surface pointed away from the source to receive light intersecting said surface from the interior thereof, and said surface having a critical angle of incidence with light rays passing through the gas along said predetermined paths and into said lens whereby to cause substantially total internal reflection thereof.

16. Apparatus as described in claim 15 in which the said rectilinearly directed rays are focussed to be convergent in passing through said chamber and the face of the said lens nearest the said source is substantially planar normal to said optical axis.

17. Apparatus as described in claim 15 in which the said rectilinearly directed rays are focussed to be parallel with said optical axis and the face of the lens nearest the said source is concavely conical.

18. Apparatus for producing an indication when the dew-point of a gas reaches or exceeds a given value, comprising a source of such gas, an expansion chamber, means for flowing a sample of gas from said source into said chamber at an initial pressure, means for maintaining the temperature of the gas within said chamber at a predetermined value, means for expanding said gas to a second volume of space of non-critical relation to the volume of said chamber and a second predetermined pressure less than said initial pressure, photo-sensitive means for detecting the presence of fog in said chamber, and electrically energized indicating means driven by said photosensitive means whereby to give an indication only when fog is formed in said chamber, a source of collimated light passing through said chamber and the light is adapted to be deflected to non-collimated condition by fog, and the apparatus including optical light valve means between the source of light and the photo-sensitive device substantially inactive except when non-collimated light passes through said chamber, the valve means comprising a conical lens whose conical angle is critical to cause internal reflection of substantially all collimated light.

19. In a dew-point detecting device of the fog chamber type in which there are inlet valve means and outlet valve means, a fog chamber having an electrical signal producing device operative to produce such signal only when a fog is present, solenoids operating the valve means, re-cycling programming means energizing the solenoids in sequence to introduce, expand and expel gas from said chamber for each cycle; a detector connected to receive said electrical signal and indicate fog presence, said detector comprising an electronic amplifier, a grid-controlled gas tube in the output of said amplifier adapted to receive the electrical signal and normally non-conducting, an electric warning device and a source of current for the same, a solenoid-operated switch, normally open, in the output of the gas tube between said current source and warning device, and normally open when the gas tube is not conducting, but closed when the gas tube conducts to energize said warning device, and means rendering said gas tube non-conducting irrespective of the receipt of any signal from said amplifier except for a fraction of time of each cycle.

20. In a dew-point detecting device of the fog chamber type in which there are inlet valve means and outlet valve means, a fog chamber having an electrical signal producing device operative to produce such signal only when a fog is present, solenoids operating the valve means, a re-cycling programming means energizing the solenoids in sequence to introduce, expand and expel gas from said chamber for each cycle; a detector connected to receive said electrical signal and indicate fog presence, said detector comprising an electronic amplifier, a grid-controlled gas tube in the output of said amplifier adapted to receive the electrical signal and normally non-conducting, an electric warning device and a source of current for the same, a solenoid-operated switch, normally open, in the output of the gas tube between said current source and warning device, and normally open when the gas tube is not conducting, but closed when the gas tube conducts to energize said warning device, there being an electrically operated indicator device normally connected with said current source when the gas tube is not conducting and a second solenoid-operated switch, normally closed, between the indicator device and current source, and a single solenoid operating both switches.

21. Automatic dew-point detecting apparatus comprising, an expansion chamber for adiabatic expansion of a sample gas a light source in the chamber including means for collimating the light from said source, a photo-sensitive device co-axially aligned with the light source to generate an electrical signal only when fog is formed in the chamber, a conical lens axially aligned parallel with said collimated light interposed between the source and photo-sensitive device arranged to transmit only light to the photo-sensitive device rendered uncollimated by such fog formation, valve controlled gas inlet and outlet means connected with the chamber, valve programming means including means for operating the valves in a predetermined sequence, electrical means connected to be energized by said electrical signal in response to said fog formation including a gating circuit rendering said electrical means ineffectively operable except at a predetermined short time at which fog would form, if at all.

22. Apparatus as described in claim 21 in which said programming means are connected to operate said gating circuit.

References Cited in the file of this patent

UNITED STATES PATENTS

| | | |
|---|---|---|
| 2,219,391 | Jacobson | Oct. 29, 1940 |
| 2,411,092 | Hood et al. | Nov. 12, 1946 |
| 2,415,776 | Walton | Feb. 11, 1947 |
| 2,569,127 | Eltenton | Sept. 25, 1951 |
| 2,593,313 | Kamm et al. | Apr. 15, 1952 |
| 2,654,242 | Fallgatter et al. | Oct. 6, 1953 |
| 2,695,400 | Snitjer | Nov. 23, 1954 |